(No Model.)

A. P. DWIGGINS.
NUT LOCK.

No. 581,702. Patented May 4, 1897.

Witnesses:
H. E. Perrin
J. M. Willis

Inventor:
Ava P. Dwiggins,
By Oliver U. Perrin,
His Attorney.

UNITED STATES PATENT OFFICE.

ALVA P. DWIGGINS, OF WAYNETOWN, INDIANA.

NUT-LOCK.

SPECIFICATION forming part of Letters Patent No. 581,702, dated May 4, 1897.

Application filed February 26, 1896. Serial No. 580,925. (No model.)

*To all whom it may concern:*

Be it known that I, ALVA P. DWIGGINS, a citizen of the United States, residing at Waynetown, in the county of Montgomery and State of Indiana, have invented a new and useful Improvement in Nut-Locks, of which the following is a specification.

My invention relates particularly to a self-locking nut for bolts, wherein bolts are used for connecting parts having more or less strain or motion on the adjoined parts, for securely connecting them without any danger of the nut working loose; and to this end my invention consists in the peculiar construction, combination, and arrangement of the several parts, as will be fully set forth in the following description and claim.

Figure 1:
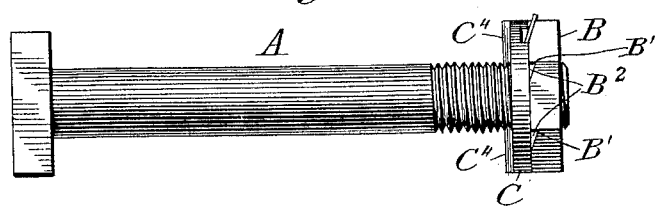
Figure 2:
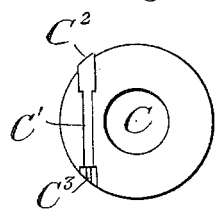
Figure 3:
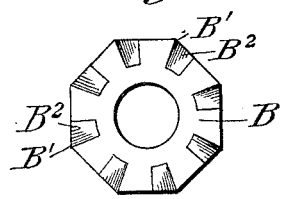
Figure 4:
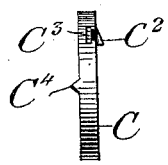

Referring to the accompanying drawings, in which like letters of reference indicate corresponding parts throughout the several views, Figure 1 is a plan view of the nut-lock entire. Fig. 2 is a plan view of the circular washer C. Fig. 3 is a plan view of the nut B. Fig. 4 is a side elevation of the washer C.

In the construction of my invention I use a bolt A, a nut B of the usual or ordinary form, except the peculiarity hereinafter noted, and a washer C, peculiar in detail of construction to my invention. The nut B has a series of grooves B' standing in from its periphery, which have a vertical wall B' and an inclined surface B² that approaches the plane surface of the nut from the direction in which the nut is turned to screw it on the bolt. The washer C, which is mounted on the bolt A adjacent the nut B, has a lateral groove C', which has a steel spring C² mounted therein, with the outer end of said spring projecting beyond the nut B and washer C and standing up above the plane surface of the washer C for operating in the series of grooves B' of the nut B. The vertical wall B' abuts the side of the upstanding outer end of the spring C², which prevents the nut B turning backward on its threaded bolt A when once tightened against the washer C. The side walls of the washer-groove C' are inclined inward over the body of the spring C², which abuts against an upstanding lug C³ at the inner end for holding it securely in said groove. The inner side of the washer C has a pair of radially-disposed ribs C⁴, which impinge on the adjacent adjoined part connected by the bolt A and prevents the washer C turning with the nut B on said bolt.

In Fig. 5 I have shown another means which prevents the washer C turning on the bolt A, and which consists of a small rib C⁵ on the inside of the opening of the washer C, which fits a small longitudinal groove A' of the bolt A and is longitudinally movable in said groove on the bolt, which prevents the washer C turning or rotating thereon.

Having thus fully described my invention and set forth the operation and advantages thereof, what I claim as new, and desire to secure by Letters Patent, is—

In a nut-lock, a bolt having screw-threads upon one end, a washer constructed with radially-disposed ribs C⁴ upon one side to impinge the fish-plate, and provided with a groove having inwardly-inclined sides to receive a key in the other side of the plate, and a lug placed at the lower end of said groove to form a stop for the key, combined with the nut having a vertical wall and an inclined surface to engage the key and fasten said nut securely upon the bolt, substantially as shown.

ALVA P. DWIGGINS.

Witnesses:
ISAAC DWIGGINS,
HARRY E. PERRIN.